US007984300B2

(12) United States Patent
Fredlund et al.

(10) Patent No.: US 7,984,300 B2
(45) Date of Patent: Jul. 19, 2011

(54) SYSTEM AND METHOD OF AUTHENICATING A DIGITALLY CAPTURED IMAGE

(75) Inventors: John R. Fredlund, Rochester, NY (US); Martin A. Parker, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1005 days.

(21) Appl. No.: 11/548,305

(22) Filed: Oct. 11, 2006

(65) Prior Publication Data

US 2007/0162756 A1 Jul. 12, 2007

Related U.S. Application Data

(62) Division of application No. 09/966,678, filed on Sep. 28, 2001, now abandoned.

(51) Int. Cl.
*H04L 9/32* (2006.01)
*G06F 7/04* (2006.01)
*G06F 17/30* (2006.01)
(52) U.S. Cl. ............. 713/176; 713/179; 726/30; 726/32
(58) Field of Classification Search .................. 713/176, 713/179; 726/32, 30
See application file for complete search history.

(56) References Cited

U.S. PATENT DOCUMENTS

| 5,164,831 | A |   | 11/1992 | Kuchta et al. |   |
|---|---|---|---|---|---|
| 5,499,294 | A |   | 3/1996 | Friedman |   |
| 5,862,217 | A |   | 1/1999 | Steinberg et al. |   |
| 5,862,218 | A |   | 1/1999 | Steinberg |   |
| 5,898,779 | A | * | 4/1999 | Squilla et al. | 713/176 |
| 5,907,619 | A | * | 5/1999 | Davis | 713/176 |

(Continued)

FOREIGN PATENT DOCUMENTS

WO    WO 00/01138    1/2000

(Continued)

OTHER PUBLICATIONS

John Kelsey et al., "An Authenticated Camera", 1996 IEEE, pp. 24-30.

(Continued)

*Primary Examiner* — Michael Pyzocha
(74) *Attorney, Agent, or Firm* — Susan L. Parulski; Christopher J. White

(57) ABSTRACT

A system and method of authenticating a digital still image captured using a digital image capture device. To process the digital still image for later authentication, a signature data is transmitted from a remote location to the digital image capture device. Upon capturing the digital still image, an image identification is associated with the digital still image. The signature data is then applied to the captured digital still image to produce an authentication signature representative of the captured digital still image. The authentication signature is associated with the image identification and transmitted from the digital still image to the remote location for storage at the remote location. To verify the authenticity of the digital still image, the digital still image is transmitted to the remote location. The signature data for the transmitted digital still image is accessed and applied to the transmitted digital still image to produce a verification signature. The authentication signature and the verification signature are compared to determine the authentication of the transmitted digital still image. In an alternate embodiment, the signature data and image identification are sent to the image capture device to generate the verification signature, which is transmitted to the remote location for comparison with the authentication signature.

14 Claims, 5 Drawing Sheets

U.S. PATENT DOCUMENTS

| | | | |
|---|---|---|---|
| 6,167,469 A * | 12/2000 | Safai et al. | 710/62 |
| 6,269,446 B1 * | 7/2001 | Schumacher et al. | 713/176 |
| 6,357,004 B1 | 3/2002 | Davis | |
| 6,522,770 B1 * | 2/2003 | Seder et al. | 382/100 |
| 6,557,102 B1 | 4/2003 | Wong et al. | |
| 6,577,336 B2 * | 6/2003 | Safai | 348/207.1 |
| 6,823,075 B2 * | 11/2004 | Perry | 382/100 |
| 6,826,315 B1 * | 11/2004 | Wickes | 382/305 |
| 6,968,058 B1 * | 11/2005 | Kondoh et al. | 380/200 |
| 7,222,235 B1 * | 5/2007 | Mitsui | 713/176 |
| 2001/0007128 A1 | 7/2001 | Lambert et al. | |
| 2002/0023220 A1 | 2/2002 | Kaplan | |
| 2002/0083323 A1 | 6/2002 | Cromer et al. | |
| 2002/0093573 A1 | 7/2002 | Cromer et al. | |
| 2003/0011684 A1 * | 1/2003 | Narayanaswami et al. | 348/207.99 |

FOREIGN PATENT DOCUMENTS

WO    WO 00/49797    8/2000

OTHER PUBLICATIONS

Gary L. Friedman, "The Trustworthy Digital Camera: Restoring Credibility to the Photographic Image", IEEE Transactions on Consumer Electronics, Nov. 1993, No. 4, NY, pp. 905-910.

Alfred Merezes, Handbook of Applied Cryptography, CRC Press, 1997, pp. 399-400.

Bruce Schneider, Applied Cryptography, 1996, John Wiley and Sons inc., p. 56.

Marc Schneider et al., A Robust Content Based Digital Signature for Image Authentication, Columbia University, 1996.

Majime Morito et al., "Digest Camera For Taking Evidential Photographic Images", 2001 IEEE, pp. 118-119.

* cited by examiner

SYSTEM AND METHOD OF AUTHENICATING A DIGITALLY CAPTURED IMAGE

CROSS REFERENCE TO RELATED APPLICATIONS

This is a divisional application of commonly assigned U.S. Ser. No. 09/966,678, filed on Sep. 28, 2001 now abandoned to Fredlund et al., titled "SYSTEM AND METHOD OF AUTHENTICATING A DIGITALLY CAPTURED IMAGE".

FIELD OF THE INVENTION

The present invention relates generally to a method of processing and authenticating a digitally captured image.

BACKGROUND OF THE INVENTION

The use of images for recording events is well known. Images can be captured using image capture devices such as a film camera, video digital camera, or a digital camera which captures digital images. Journalists use digital cameras such as the Kodak DCS 315 to capture images of newsworthy events. Digital cameras such as the Kodak DCS 330 are used to capture images at construction sites or other places where a visual record of the event is needed. Typically, a user of a digital camera captures a plurality of digital images which are stored on a removable memory card. These digital images may be transferred from the memory card and stored, for example, on a hard drive of a computer, recordable compact disc (CD), or other non-volatile memory associated with the user's computer. While digital images captured using a digital cameras are convenient to capture and transfer, the digital image are also relatively easy to modify, and the modifications can be difficult to detect. Accordingly, the authenticity of the digital image may be at issue.

Several approaches have been taken to insure the authenticity of a digital image. One approach is to connect a digital camera to a secure image storage facility over a secure link. Using this approach, the veracity of the digital image captured using the digital camera is dependent on the security of the link and the storage facility. While this approach may be suitable for its intended purpose, this approach mandates maintenance of a large image database and secure links to it. For example, WO 00/01138 (Steinberg) discloses an "escrow" security transmission wherein images "first data" are sent to a first location and other information "second data" is sent to a second location.

Methods of encoding data within a digital image are known to those skilled in the art. The encoded data can be used in an attempt to provide a "stamp of authenticity" for an image. However, if a portion of the image is modified, the encoded data may still remain intact, and the tampering will not be recognized. For example, U.S. Pat. No. 5,862,218 (Steinberg) discloses a camera using indicium received from a host computer to mark an image in a non-destructive manner to form a modified image data and add the indicium to an image header.

Encryption might be employed to verify the authenticity of a digital image. If an image is encrypted by the digital camera, it can be decrypted at a later time only by those with the proper decryption "key". However, the utility of the image is lost for all those who do not have the decryption key. For example, U.S. Pat. No. 5,862,217 (Steinberg) discloses a digital camera providing encryption of an image during the acquisition process to attempt to avoid the existence of unencrypted image data.

Accordingly, while these methods may have achieved certain degrees of success for their particular application, a need continues to exist for a method for verifying the authenticity of a digital image which overcomes the problems of the existing methods. In particular, a need continues to exist for a method for verifying the authenticity of a digital image without reducing the utility of the digital image. That is, the method should allow use of the digital image by numerous users, of which only a portion may have a need to authenticate the image.

SUMMARY OF THE INVENTION

An object of the present invention is to provide a system and method of determining the authenticity of a digitally captured image.

Another object of the invention is to provide such a system and method which does not reduce the utility of the image.

A further object of the invention is to provide such a system and method which maintains flexibility and portability of the image capture device used to capture the image.

Still another object of the invention is to provide such a system and method which does not mandate maintenance of a large image database.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method of processing for later authentication a digital still image captured using a digital image capture device. The method comprises the steps of transmitting signature data from a remote location to the digital image capture device; associating an image identification with the digital still image; applying the signature data to the captured digital still image to produce an authentication signature representative of the captured digital still image; associating the authentication signature with the image identification; transmitting the authentication signature to the remote location; and storing the signature data, authentication signature, and image identification at the remote location.

According to another aspect of the invention, there is provided a system for processing for later authentication a digital still image. The system includes a digital image capture device including an image processor, a remote location remote from the digital image capture device, and communication means. The digital image capture device captures the digital still image. The remote location comprises a database for storing signature data, an authentication signature, and an image identification. The image identification is associated with the digital still image captured by the digital image capture device, and the authentication signature is associated with the image identification. The communication means transmits the signature data from the remote location to the digital image capture device, and transmits the authentication signature for the digital still image to the remote location. The image processor applies the signature data to the captured digital still image to produce the authentication signature, with the authentication signature being representative of the captured digital still image.

According to a further aspect of the invention, there is provided a method of authenticating a digital still image captured using a digital image capture device. To process the image for later authentication, signature data is transmitted from a remote location to the digital image capture device. Upon capturing the digital still image, an image identification is associated with the digital still image. The signature data is then applied to the captured digital still image to produce an authentication signature representative of the captured digital still image. The authentication signature is associated with the image identification and transmitted from the digital still image to the remote location for storage at the remote location. To later authenticate the digital still image, the digital still image is transmitted to the remote location. The signature data for the transmitted digital still image is accessed and applied to the transmitted digital still image to produce a verification signature. The authentication signature and the verification signature are compared to determine the authentication of the transmitted digital still image.

According to a still further aspect of the invention, there is provided a system for authenticating a digital still image captured using a digital image capture device and processed using signature data provided to the digital image capture device to produce an authentication signature representative of the digital still image. The system comprises a remote location remote from the digital image capture device, communication means for transmitting the digital still image to the remote location for authentication, and a processor located at the remote location. The remote location comprises a database for storing the signature data and authentication signature. The processor applies the signature data to the transmitted digital still image to produce a verification signature and compares the authentication signature with the verification signature to determine the authentication of the digital still image.

According to yet another aspect of the present invention, there is provided a method of authenticating a digital still image captured using a digital image capture device. To process the image for later authentication, signature data is transmitted from a remote location to the digital image capture device. Upon capturing the digital still image, an image identification is associated with the digital still image. The signature data is then applied to the captured digital still image to produce an authentication signature representative of the captured digital still image. The authentication signature is associated with the image identification and transmitted from the digital image capture device to the remote location for storage at the remote location. To later authenticate the digital still image, the signature data corresponding to the image identification for the image in question is transmitted to the image capture device upon which the image to be authenticated resides (or alternatively, to a computer on which the image to be authenticated resides). The signature data for the digital still image is applied at the image capture device to the digital still image to produce a verification signature. The verification signature is transmitted to the remote location. At the remote location, the authentication signature and the verification signature are compared to determine the authentication of the digital still image.

The present invention provides a system and method for determining the authenticity of a digitally captured image wherein a remote database comprises signature information, and the stored signature information is accessed to authenticate the image.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
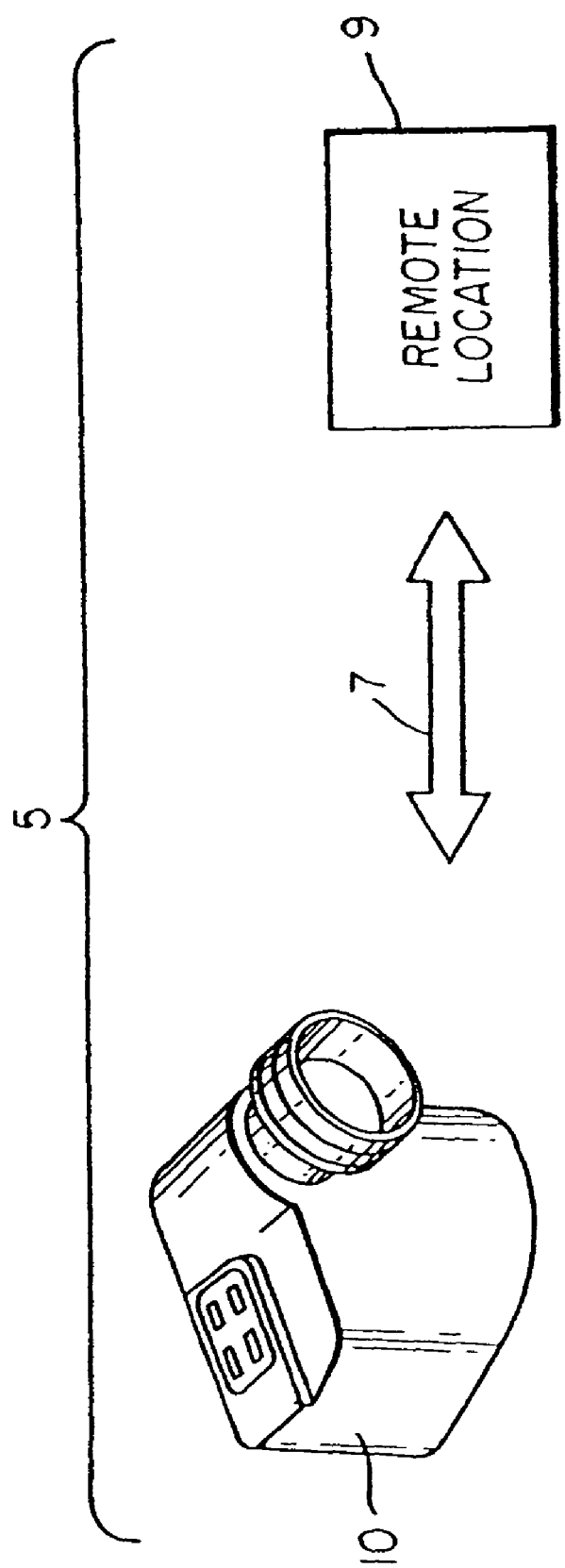
FIG. 1 generally illustrates a system in accordance with the present invention for processing a digital still image for later authentication.

The following is a detailed description of the preferred embodiments of the invention, reference being made to the drawings in which the same reference numerals identify the same elements of structure in each of the several figures.

The present invention relates generally the processing and authenticating of a digitally captured image while providing flexibility and portability of the image capture device used to capture the image. More particularly, the present invention provides a system and method of verifying the authenticity of a digital image on the basis of an authentication signature stored at a secure remote location. The digital image is not encrypted nor stored at the remote location. As such, the utility of the digital image is not reduced. Rather, the authentication signature is accessed each time the authenticity of the digital image is at issue. If the digital image maintains the same signature, the digital image is considered to be authentic.

FIG. 1 generally illustrates a system 5 in accordance with the present invention for processing a digital still image for later authentication. System 5 includes an image capture device 10 for capturing the digital image capture device, and communication channel 7 for communicating with a remote location 9.

Figure 2:
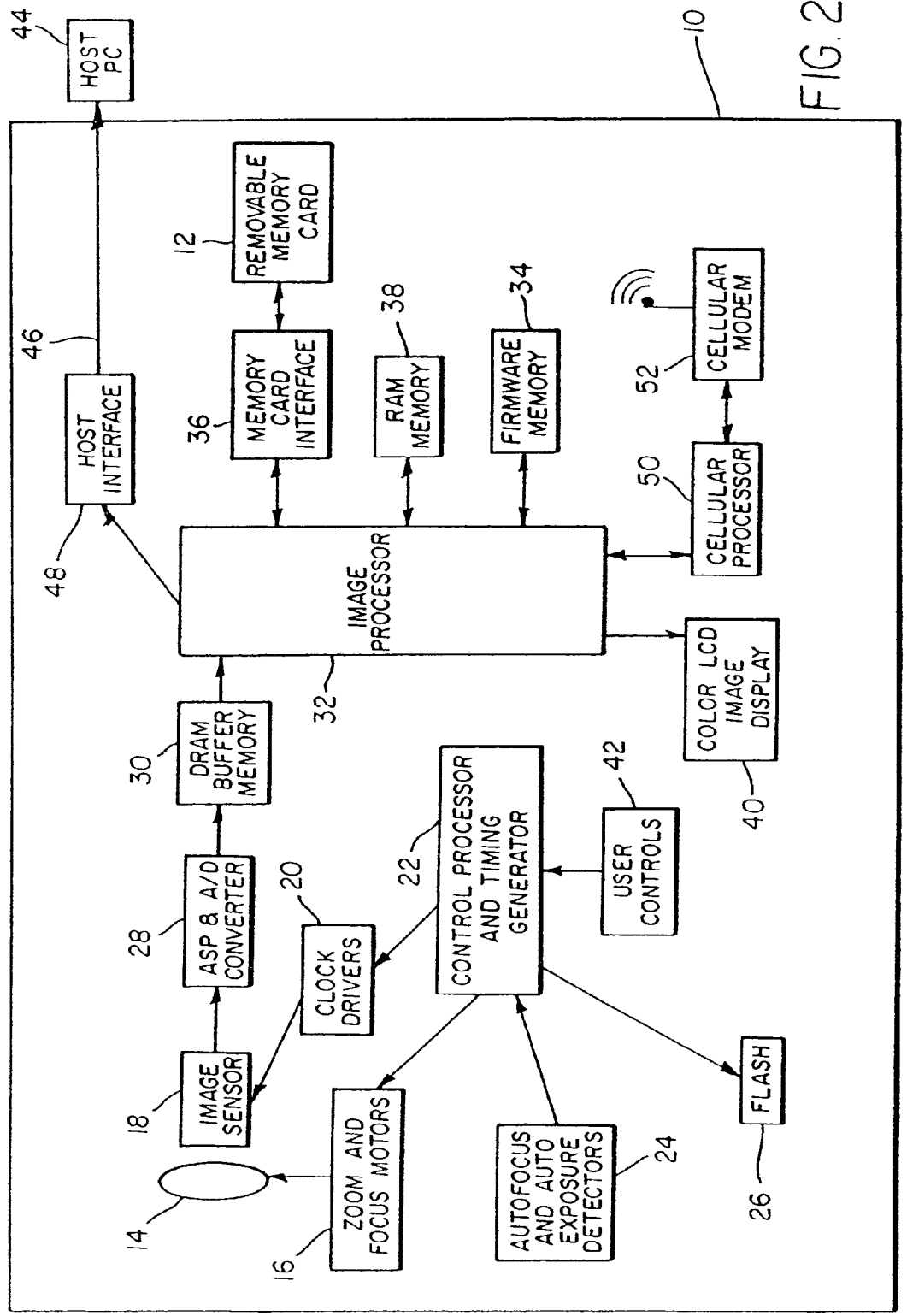
FIG. 2 shows a block diagram of an image capture device suitable for use with the present invention.

While those skilled in the art will recognize image capture devices suitable for use with system 5, FIG. 2 shows a block diagram of a typical image capture device 10 suitable for use with system 5. Image capture device is preferably a digital camera adapted to capture images in electronic form. Image capture device 10 captures digital images which are stored on a removable memory card 12. Removable memory cards 12 are known to those skilled in the art. For example, removable memory card 12 can include memory cards adapted to the PCMCIA card interface standard and the *CompactFlash Specification Version* 1.3, published by the CompactFlash Association, Palo Alto, Calif., Aug. 5, 1998. Other types of digital memory devices, such as magnetic hard drives, magnetic tape, or optical disks, could alternatively be used to store the digital images.

Image capture device 10 may include a zoom lens 14 having a zoom and focus motor 16 and an adjustable aperture and shutter (not shown). When an image is being captured using image capture device 10, zoom lens 14 focuses light from a scene being captured (not shown) onto an image sensor 18. Image sensor 18 may be, for example, a single-chip color charged couple device (CCD) image sensor, and may employ the well known Bayer color filter patterns. Image sensor 18 is controlled by a clock driver(s) 20. Zoom and focus motors 16 and clock driver 20 are controlled by control signals supplied by a control processor and timing generator 22. Control processor and timing generator 22 receives inputs from an autofocus and autoexposure detector 24 and controls a flash 26. An analog output signal from the image sensor 18 is amplified and converted to digital data by an analog signal processing (ASP) and analog-to-digital (A/D) converter 28. Digital data received from converter 28 is stored in a DRAM buffer memory 30 and subsequently processed by an image processor 32. Image processor 32 is controlled by firmware stored in a firmware memory 34, which can be, for example, flash EPROM memory.

Image processor 32 will process the image captured in accordance with instructions stored in firmware memory 34. Image processor 34 performs color interpolation followed by color and tone correction, in order to produce rendered sRGB image data. The rendered sRGB image data can then be compressed, for example using the well known JPEG format. Using memory card interface 36, the compressed image data is then stored as an image file on removable memory card 12. Image processor 32 preferably creates a "thumbnail" size image that is stored in RAM memory 38 and supplied to a color LCD image display 40, which displays the captured image for the user to review. This low-resolution "thumbnail" size image, can be created as described in commonly assigned U.S. Pat. No. 5,164,831 (Kuchta, et. al.), the disclosure of which is herein incorporated by reference. The thumbnail image preferably has 160×120 pixels, and is stored within the Exif version 2.1 image file along with the compressed full resolution image.

Image capture device 10 is controlled by user controls 42, such as a series of user buttons including a shutter release (e.g., capture button) (not shown) which initiates an image capturing operation. A graphical user interface displayed on the color LCD image display 40 is controlled by a user interface portion of firmware stored in firmware memory 34.

The image captured by image capture device 10 can be transferred to a personal computer by removing removable memory card 12 from image capture device 10 and inserting removable memory card 12 in a card reader (not shown) in a computer 44, such as a home personal computer. Alternatively, an interface cable 46 can be used to connect between a host interface 48 in image capture device 10 and a CPU motherboard (not shown) in computer 44. Interface cable 46 can conform to, for example, the well known universal serial bus (USB) interface specification.

In a preferred embodiment, image capture device 10 comprises a cellular processor 50 adapted to initiate a cellular phone call by means of a cellular modem 52.

Referring again to FIG. 1, image capture device 10 is in communication with remote location 9, remote from image capture device 10, by means of communication channel 7. Remote location 9 includes software and/or a database or other known means for storing information. Remote location 9 can be operated, for example, by a retailer, photofinisher, computer service provider, security agency, insurance agency or other service provider.

Figure 3:
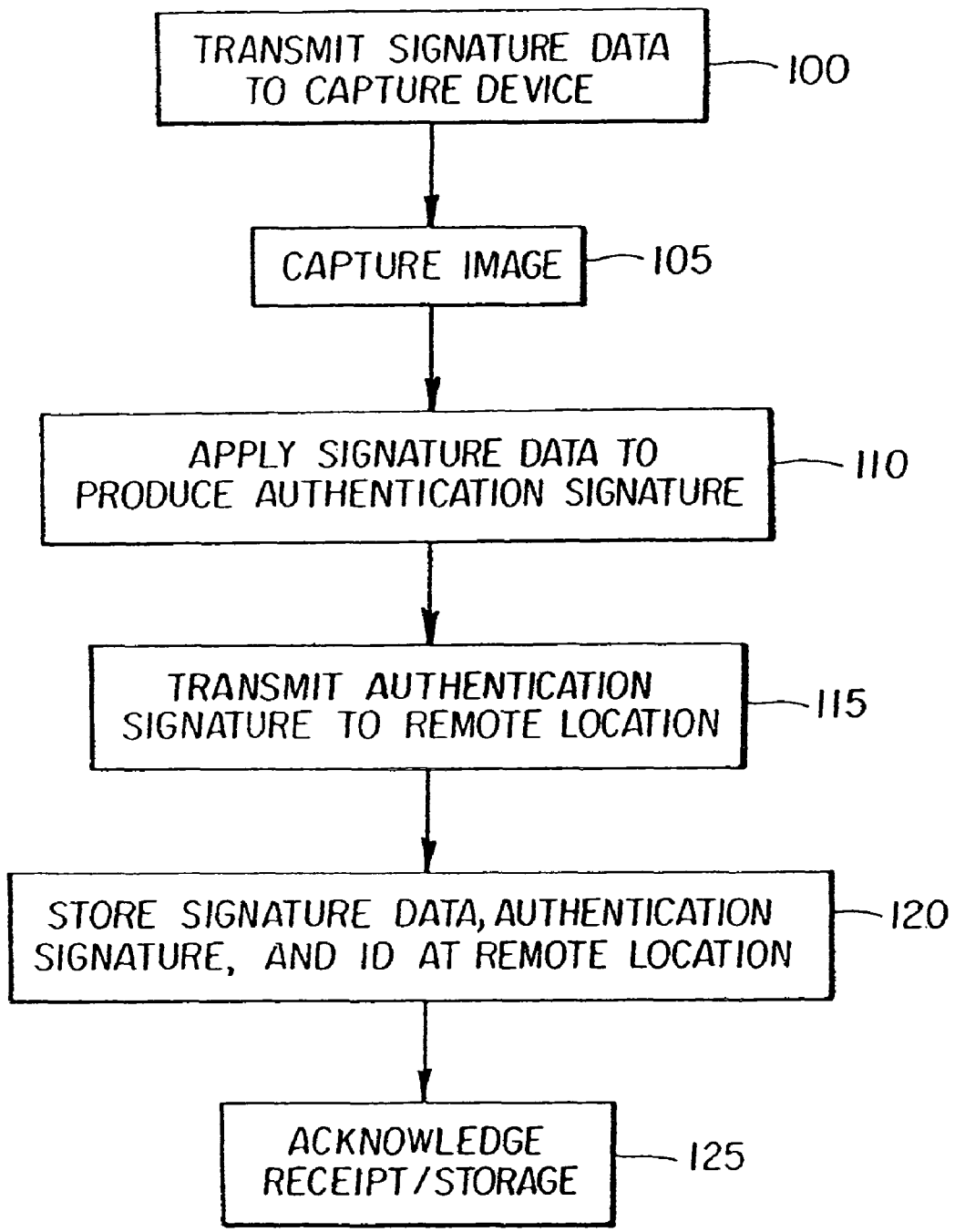
FIG. 3 shows a flow diagram of a method in accordance with the present invention for processing a digital still image for later authentication.

Referring now to FIG. 3, to process a digital still image for later authentication, remote location 9 transmits signature data SD to image capture device 10 via communication channel 7 (step 100). The image is captured using image capture device 10 (step 105). Image processor 32 of image capture device 10 applies signature data SD to the captured image to process the image and produce an authentication signature AS representative of the captured image (step 110).

Signature data SD can be transmitted to image capture device 10 prior to the capture of the image. Alternatively, signature data SD can be transmitted subsequent to the capture of the image by image capture device 10.

Signature data SD comprises information for processing the captured image so as to produce authentication signature AS. For example, signature data SD might be a hashing algorithm, such as the SHA-1 algorithm as specified in FIPS PUB 180-1, which hashes any given size data to only 20 bytes. Hashing algorithms are well known algorithms wherein each pixel value in the image is acted upon by a particular function to determine a number that is representative of the image. The function is sensitive to any change in the image. Accordingly, if any pixel of the image is changed/modified, the output of the hashing algorithm will differ from the original. This hashing algorithm may be performed before or after compression of the captured image, and before or after other image manipulations. The sequence of operation is determined by file size and acceptable image quality losses. It may be that a large file without compression losses is preferred in applications where authenticity of the captured image is critical.

Other signature data SD may be known to those skilled in the art, for example, a lookup table or checksum data. Alternatively, signature data SD may be an algorithm that processes a string of numbers/characters, which in the instant application is the image data, to provide a unique or substantially unique numerical value. Additionally, signature data SD may be a set of variable input to an algorithm disposed in the image capture device that causes the algorithm to generate a unique or substantially unique numerical value based on the variable input and the image data.

Preferably, remote location 9 employs a plurality of signature data SD so as to maintain anonymity and reduce counterfeiting, and consequently maintain the security, of the authentication signature produced. A random generator may be used to determine which signature data to employ.

Once authentication signature AS is produced, an image identification ID is associated with the captured image and authentication signature AS. Image identification ID can be generated by image capture device 10, or alternatively, by remote location 7. The generation of image identification ID can be conducted prior or subsequent to the capture of the image. Image identification ID can comprise numerical, alphabetical, textual, iconic, and/or graphical information. For example, image identification ID could include the serial number of image capture device 10 concatenated with the date and time the image was captured, thereby producing a unique image identification ID. Image identification ID must be stored with the captured image for authentication purposes.

Authentication signature AS may also comprise a series of values. If the digital still image is divided/configured into segments, such as rectangular areas, signature data SD can be applied to each of the segments individually to yield a value. These individual values create an authentication signature for each of the segments (i.e., a segment authentication signature). The authentication signature for each of the segments can be stored at the remote location. As such, authentication signature AS can comprise this series of values. In this manner, portions of cropped/zoomed digital still images may be verified. Alternatively, signature data SD is applied to portions of the digital still image. That is, while the digital still image is configured into a plurality of segments, signature data SD is not applied to all the segments but is applied to at least one of the plurality of segments to produce at least one segment authentication signature.

Authentication signature AS is transmitted to remote location 9 (step 115) by means of communication channel 7. Signature data SD, authentication signature AS, and image identification ID are then stored at remote location 9 (step 120) for later authentication of the digital still image. A message may be optionally transmitted by remote location 9 indicative of the receipt/storage of authentication signature (step 125).

It is understood that the captured digital still image is not encoded, marked, or encrypted. As such, utility of the image has not been affected. However, the captured image may be encoded, marked, or encrypted as the user desires and the present invention may be employed to provide authentication.

It is also understood that authentication signature AS is not stored by image capture device 10. Rather, authentication signature AS is stored at remote location 9.

It is preferred that signature data is stored at remote location 9 and not stored by image capture device 10. While signature data SD may be stored at any location, storage at a location other than remote location 9 is not beneficial since authentication is available by means of signature data SD and authentication signature AS stored at remote location 9.

Figure 4:
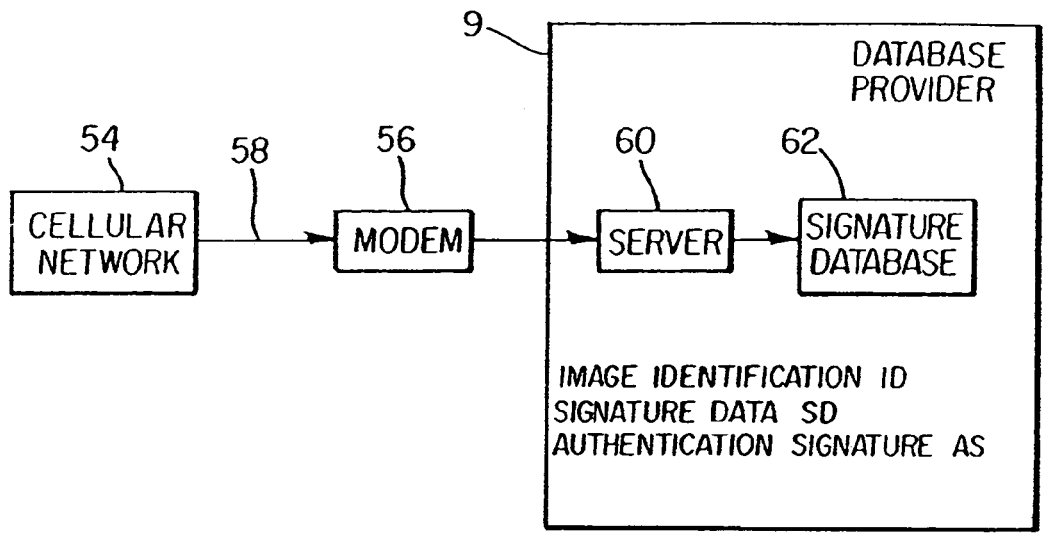
FIG. 4 generally illustrates a system in accordance with the present invention suitable for authenticating a digital still image processed in accordance with the method illustrated in FIG. 3.

Referring now to FIG. 4, communication channel 7 can comprise well known communication means though preferably communication channel 7 includes a cellular network 54 adapted to provide communication between image capture device 10 and remote location 9 by means of a cellular modem 52. More particularly, cellular network 54 provides a communication network between image capture device 10 and cellular modem 56 disposed at remote location 9 by means of channel 58, which can be a wired channel.

In FIG. 4, remote location 9 is illustrated as a database provider including a server 60 and signature database 62. Once authentication signature AS has been determined, image processor 32 communicates authentication signature AS to cellular processor 50. Cellular processor 50 initiates a cellular phone call via cellular modem 52. Authentication signature AS and image identification ID are transmitted to cellular network 54 by means of cellular modem 52. Authentication signature AS and image identification ID are then transferred to remote location 9 by means of channel 58. Server 60 places image identification ID and authentication signature AS in signature database 62. Signature data SD is also stored in signature database 62. Server 60 may optionally initiate a message to image capture device 10 via channel 58 confirming the storage of the data. Image capture device 10 is then free to terminate the connection, continue image capture, or provide other functions/operations.

It is understood that a cellular connection is preferred to promote mobility and flexibility, but that other connections, wired or wireless, can be employed.

In an alternate embodiment, signature data SD resides in image capture device 10. Such an arrangement reduces the communication between remote location 9 and image capture device 10. However, such an arrangement also reduces the level of security since signature data SD is not specific to an image nor changed as a function of time.

In a further embodiment, the captured image can be transmitted to remote location 9 where signature data SD can be applied to produce authentication signature AS. While this arrangement would eliminate the transmitting of authentication signature AS from image capture device 10 to remote location 9, it would require the transmitting of the image to remote location 9, and such transmission could be cumbersome and time consuming. Accordingly, while such an arrangement is not preferred, there is a benefit to this arrangement in that the image need not be stored at remote location 9.

If image capture device 10 is unable to communicate with remote location 9, image capture device 10 may continue to capture images, and the corresponding authentication signatures and image identifications would be stored for later transmittal to remote location 9. Similarly, captured images alone would be stored/captured if there is no connection with remote location 9 and/or signature data SD does not reside in image capture device 10. Image capture device 10 can be configured to continuously attempt communication with remote location 9 until a successful connection is made.

To promote security, image capture device 10 may be configured such that authentication signature AS is not valid or not produced if removable memory card 12 is removed from image capture device 10 or if any image data is uploaded to image capture device 10. Further, image capture device 10 may be configured such that authentication signature AS will be not valid or produced if image capture device 10 loses power. As such, image capture device 10 may comprise a plurality of power supplies to ensure continuous power. Still further, image capture device 10 may include detectors to detect whether tampering of image capture device 10 has occurred. If tampered with, authentication signature AS would not be produced and any captured images would be marked. Such features of image capture device 10 would promote security.

Time stamps, GPS (global positioning systems), directions, and other data may be incorporated into the image prior to the creation of authentication signature AS. Time stamps may provide useful authenticating functions. For example, an indication that the digital still image has not been modified prior to creating authentication signature AS can be provided if the elapsed time between capture and creation and transmission of authentication signature AS is small. In addition, the time of transmission of signature data SD and the time of capture of the digital still image may be transmitted and stored with authentication signature AS to provide another indication of authenticity.

Since the captured digital still image is not encoded, marked, or encrypted, the captured digital still image can be provided to memory card interface 36 for storage on removable memory card 12 and viewing on home computer 10.

Figure 5:
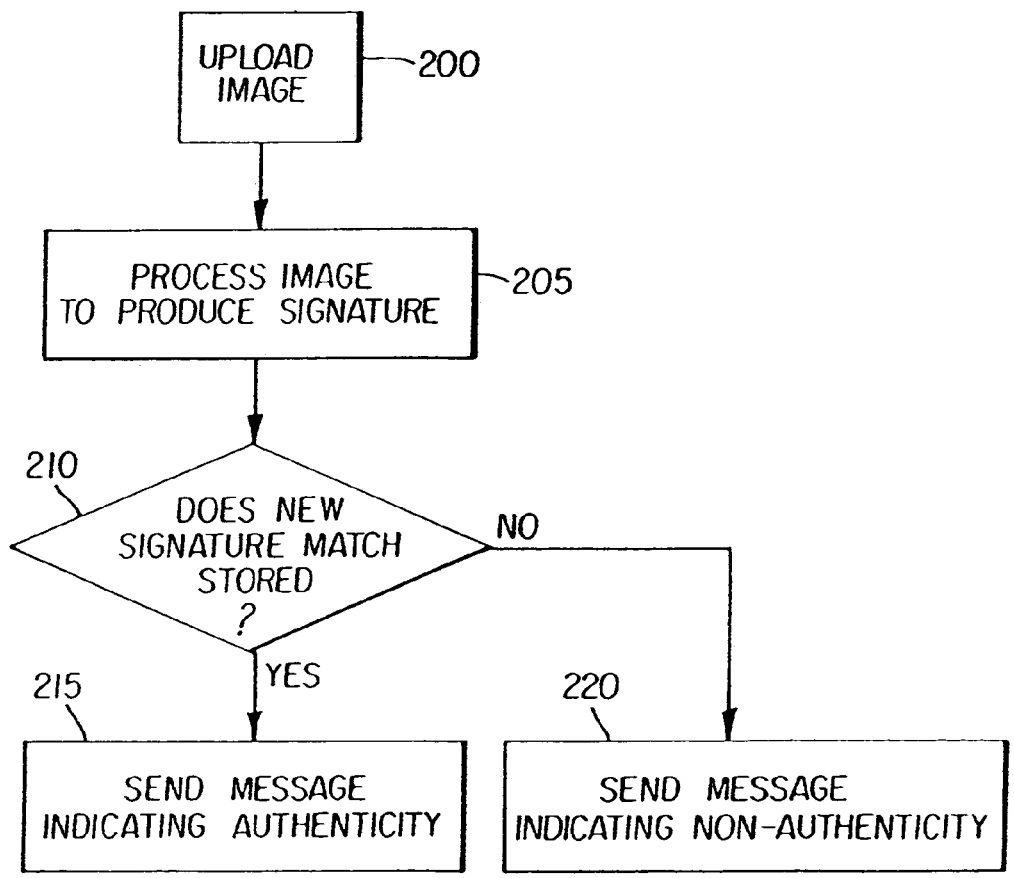
FIG. 5 shows a flow diagram of a method in accordance with the present invention for authenticating a digital still image processed in accordance with the method illustrated in FIG. 3.

With the captured digital still image processed in accordance with the method described above, the processed digital still image may be later authenticated. FIG. 5 illustrates a method in accordance with the present invention for authenticating a digital still image processed in accordance with the method described above.

To determine the authenticity, an authentication request for the digital still image is initiated from a request location to remote location 9. The request location is remote from remote location 9, and can be image capture device 10, a computer, or other device adapted to communicate with remote location 9. The image to be authenticated is then uploaded to remote location 9. Accordingly, the image to be authenticated is transmitted to remote location 9 at step 200. The transmission can be accomplished by means of communication channel 7 or other communications means available, either wired or wireless. The image to be authenticated may be uploaded from the request location or from another source/location, for example, image capture device 10, a personal computer, or other device.

Once uploaded, server 60 determines image identification ID associated with the transmitted image. From image identification ID, the corresponding signature data SD and authentication signature AS can be accessed.

Server 60 applies signature data SD to the transmitted image to produce a verification signature VS (step 205). Server 60 then compares authentication signature AS with verification signature VS (step 210) using means known to those skilled in the art. If the two signatures are substantially the same, the transmitted image is believed to be the same image as was originally captured by image capture device 10. As such, server 60 would initiate an authentication message indicative of the authenticity (step 215). In contrast, is the two signatures are determined to not be substantially the same at step 210, server 60 initiates an authentication message indicating that the transmitted image is not authentic or that authenticity cannot be verified (step 220). The authentication message(s) initiated by server 60 can be sent to image capture device 10, a personal computer, or the device from which the image to be authenticated was transmitted.

It is understood that the method as disclosed in FIG. 5 can be accomplished at a location other than (i.e., different from) remote location 9 (e.g., an authentication location). If the authentication location is not the same as remote location 9, communication means are needed to securely transmit signature data SD, authentication signature AS and image identification ID from remote location 9 to the authentication location. For example, the authentication location can be image capture device 10. Either all, or a portion of, the method can be accomplished at the authentication location. For example, if the application of signature data SD to the image is computationally intensive, the application of signature data SD to the image may be accomplished at the other location with the results (i.e., verification signature VS) being transmitted to remote location 9 for comparison with authentication signature AS. As such, the security of authentication signature AS would be maintained since it would not be transmitted from remote location 9.

Optionally, server 60 may provide and transmit an authentication code which will allow the user to verify the veracity of the authentication message.

Figure 6:
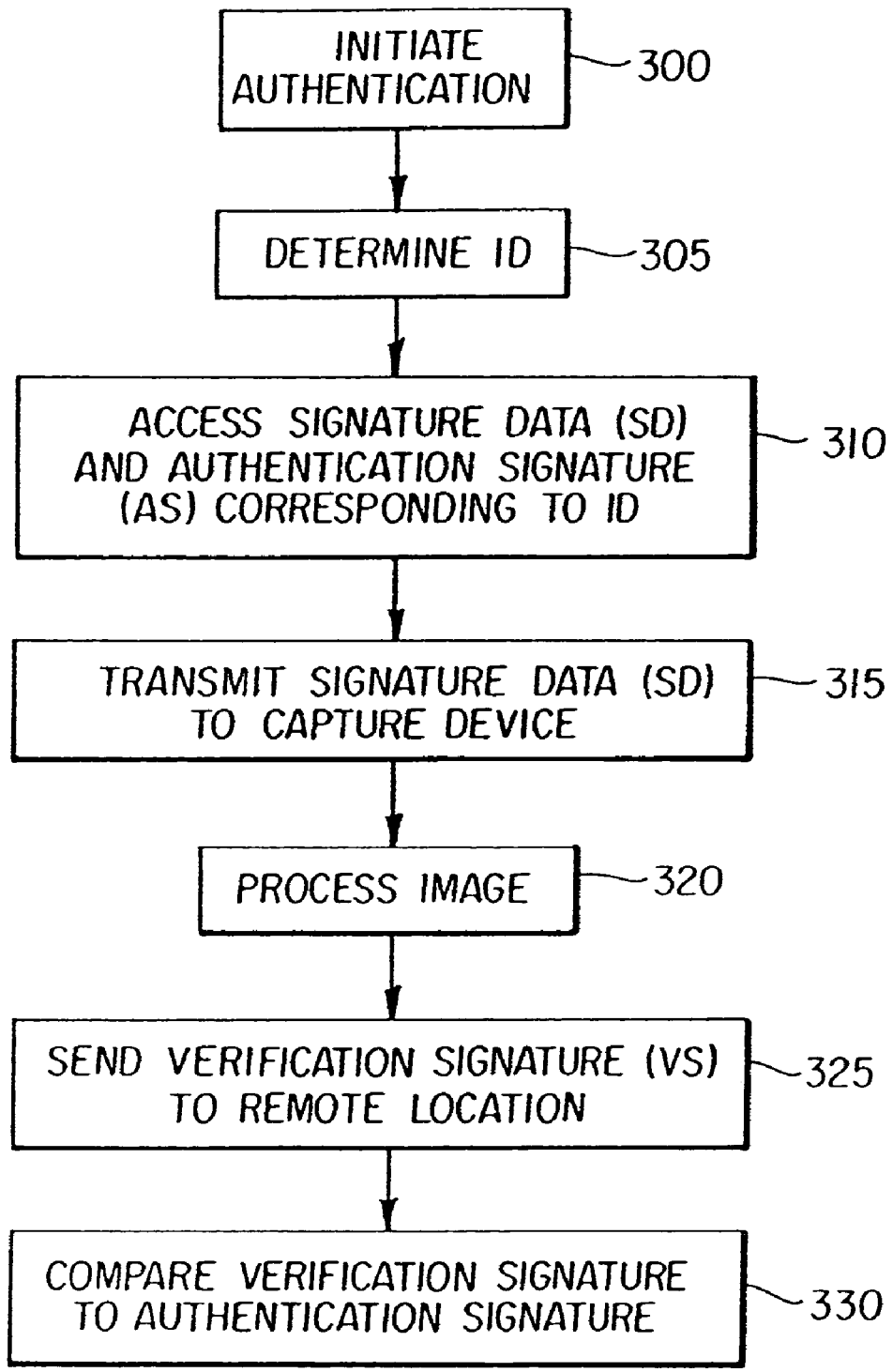
FIG. 6 shows a flow diagram of a method in accordance with the present invention for authenticating a digital still image using an image capture device.

Referring to FIG. 6, image capture device 10 may be employed to authenticate the image in accordance with the present invention. The digital still image is captured and processed in accordance with the method disclosed in FIG. 3. To authenticate the image, an authentication request is initiated from image capture device 10 to remote location 9 (step 300). Image identification ID for the digital still image to be authenticated is determined (step 305) and transmitted to remote location 9. Remote location 9 determines signature data SD and authentication signature AS corresponding to image identification ID (step 310). Signature data SD is transmitted to image capture device 10 (step 315) and applied to the digital still image at image capture device 10 to produce verification signature VS (step 320). Verification signature VS is transmitted to remote location 9 (step 325) where it is compared with authentication signature AS to determine the authentication of the digital still image (step 330).

Similarly, a personal computer or other device adapted to store the digital still image (i.e., where the digital still image resides) can be employed. When the authentication request is initiated, image identification ID is determined and transmitted to remote location 9. Remote location 9 determines signature data SD and authentication signature AS corresponding to image identification ID. Signature data SD is transmitted to the personal computer and applied to the digital still image to produce verification signature VS. Verification signature VS is transmitted to remote location 9 where it is compared with authentication signature AS to determine the authentication of the digital still image.

Should a location other than remote location 9 be employed to authenticate the image (such as image capture device 10 or computer), it may be desired to ensure the authenticity of signature data SD and image identification ID. That is, when signature data SD and image identification ID are transmitted from remote location 9 to an authentication location (such as image capture device 10 or a personal computer as described above), an additional step may be desired to verify the authenticity of signature data SD and image identification ID at the authentication location.

One method to verify the authenticity of signature SD and image identification ID at an authentication location is to generate a digital signature DS when processing the digital still image. Digital signature DS would be stored at remote location 9 along with signature data SD, authentication signature AS, and image identification ID, and transmitted to the authentication location when required.

That is, when the digital still image is processed, a digital signature DS is also generated. Digital signature DS can generated, for example, by applying signature data SD to image identification ID. Those skilled in the art will recognize other means of generating digital signature DS, for example, by applying an algorithm to the concatenation of signature data SD and image identification ID. Once generated, digital signature DS is stored in remote location 9 along with signature data SD, authentication signature AS, and image identification ID. Then, when an authorization request is transmitted to remote location 9, digital signature DS is transmitted to the authentication location along with signature SD and image identification ID. The authentication location can apply signature data SD to image identification ID and determine if the result is substantially equal to digital signature DS and therefore authentic. If digital signature DS is not generated using solely signature SD and image identification ID, then the additional key/algorithm/data would need to be stored at remote location 9 and also transmitted. Alternatively, digital signature DS may not be transmitted to the authentication location. The authentication location can apply signature data SD to image identification ID and send the result to remote location 9. At remote location 9, the result can be compared to digital signature DS to verify that the appropriate signature data SD will be applied to the appropriate image.

An advantage of the present invention is that remote location 9 need not store image information, but rather signature information. Accordingly, the size and complexity of remote location 9 is simplified since only small amounts of data need be stored for each image. The provider of remote location 9 can reduce costs associated with the database.

Another advantage of the present invention is that the digital image remains in the possession of the user, thus the user controls the image. The image may be used for viewing and verification need only be established as needed.

The small amount of data sent to remote location 9 provides an advantage in usage of the communications device/channel. Since only a small amount of data is sent, channels such as cellular telephony can be used to transfer the data that will later be used for verification.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 5 authentication image processing system
7 communication channel
9 remote location
10 image capture device; digital camera
12 memory card
14 zoom lens
16 zoom and focus motor
18 image sensor
20 clock driver(s)
22 control processor and timing generator
24 autofocus and autoexposure detector(s)
26 flash
28 ASP and A/D converter
30 DRAM buffer memory
32 image processor
34 firmware memory
36 memory card interface
38 RAM memory
40 color LCD image display
42 user controls
44 personal computer
46 interface cable
48 host interface
50 cellular processor
52 cellular modem
54 cellular network
56 cellular modem
58 channel
60 server
62 signature database

The invention claimed is:

1. A method of authenticating a transmitted digital still image against a captured digital still image, comprising:
   a) capturing the captured digital still image using a digital image capture device, wherein the capture device does not store signature data;
   b) transmitting selected signature data of a plurality of remote-location signature data from a remote location remote from the digital image capture device to the digital image capture device;
   c) associating an image identification with the captured digital still image;
   d) applying the signature data to the captured digital still image to produce an authentication signature representative of the captured digital still image, so that the authentication signature is produced using the signature data and the image data of the captured digital still image;
   e) associating the authentication signature with the image identification;
   f) transmitting the authentication signature to the remote location;
   g) storing the selected signature data, authentication signature, and image identification at the remote location;
   h) transmitting the transmitted digital still image to the remote location, wherein the transmitted digital still image does not include the selected signature data or the authentication signature;
   i) accessing the selected signature data for the transmitted digital still image;
   j) applying the selected signature data to the transmitted digital still image to produce a verification signature; and
   k) comparing the authentication signature with the verification signature to authenticate the transmitted digital still image against the captured digital still image.

2. The method of claim 1, further comprising the step of producing an authentication message indicative of the authentication of the transmitted digital still image.

3. The method of claim 1, wherein the signature data from the remote location is transmitted to the digital image capture device prior to the capture of the digital still image.

4. The method of claim 1, wherein the remote location comprises a database for storing the authentication signature.

5. The method of claim 1, further comprising the step of transmitting a message indicative of receipt of the authentication signature by the remote location.

6. The method of claim 1, wherein the captured digital still image includes a plurality of segments, step d) further includes applying the signature data to at least one of the segments to produce a respective segment authentication signature, and the authentication signature of the captured digital still image comprises at least one of the segment authentication signature(s).

7. The method of claim 1, wherein the authentication signature is computed using timestamps, GPS data or direction data.

8. The method of claim 1, wherein the remote location stores with the authentication signature one or more of the time of capture of the captured digital still image, a time of calculation of the authentication signature, a time of transmission of the signature data to the digital image capture device, and a time of transmission of the authentication signature to the remote location, and wherein step j further includes inspecting the stored time(s) to authenticate the transmitted digital still image.

9. The method of claim 1, wherein the authentication signature does not include image content.

10. The method of claim 9, wherein the captured digital still image includes a plurality of segments, step d) further includes applying the signature data to at least one of the segments to produce a respective segment authentication signature, and the authentication signature of the captured digital still image comprises at least one of the segment authentication signature(s).

11. The method of claim 9, wherein the authentication signature is computed using timestamps, GPS data or direction data.

12. The method of claim 9, wherein the remote location stores with the authentication signature one or more of the time of capture of the captured digital still image, a time of calculation of the authentication signature, a time of transmission of the signature data to the digital image capture device, and a time of transmission of the authentication signature to the remote location, and wherein step j further includes inspecting the stored times to authenticate the transmitted digital still image.

13. The method of claim 1, wherein the selected signature data is transmitted subsequent to the capture of the image by the image capture device.

14. The method of claim 1, wherein the selected signature data is specific to an image.

* * * * *

UNITED STATES PATENT AND TRADEMARK OFFICE
CERTIFICATE OF CORRECTION

| | | |
|---|---|---|
| PATENT NO. | : 7,984,300 B2 | |
| APPLICATION NO. | : 11/548305 | |
| DATED | : July 19, 2011 | |
| INVENTOR(S) | : John R. Fredlund et al. | |

It is certified that error appears in the above-identified patent and that said Letters Patent is hereby corrected as shown below:

ON THE TITLE PAGE

Item 54, in the second line of the title, and in the Specification, Column 1, line 2, replace "AUTHENICATING" with "AUTHENTICATING"

Signed and Sealed this
Thirtieth Day of September, 2014

Michelle K. Lee
*Deputy Director of the United States Patent and Trademark Office*